Patented Dec. 26, 1939

2,184,512

UNITED STATES PATENT OFFICE 2,184,512

PRESERVATION OF RUBBER

William Baird and Maldwyn Jones, Blackley, England, assignors to Imperial Chemical Industries Limited, a corporation of Great Britain No Drawing. Application April 1, 1936, Serial No. 72,209. In Great Britain April 10, 1935

13 Claims. (Cl. 260—807)

This invention relates to the preservation of rubber and particularly to the treatment of rubber with compounds which will retard the deterioration normally due to the action of light, heat and oxygen and flexing.

It is well known to those accustomed to handling rubber articles that the rubber perishes with the passage of time. It is also known to those skilled in the manufacture of rubber articles that rubber can undergo various types of mechanical failure such, for instance, as the cracking which follows repeated flexing.

It is known that the perishing of rubber is due largely to oxidation, but the causes of the various types of mechanical failure such as flex-cracking are less known but it is probable that oxidation is one of them. The preservation of rubber against perishing has been long a goal for rubber technologists, and more recently efforts have also been directed towards preserving the rubber against the various kinds of mechanical failure. The step taken to effect this preservation is that of incorporating in the rubber a small proportion of a suitable preserving agent. The preserving agents are usually spoken of as anti-oxidants for reasons which can be seen from the foregoing.

In British Patent No. 434,951 there is described a process for the manufacture of vulcanized rubber having improved resistance to deterioration and flex-cracking, which comprises incorporating 4:4'-dimethoxydiphenylamine with the rubber before vulcanizing. 4:4'-dimethoxydiphenylamine is stated to be particularly valuable in retarding flex-cracking and in fact to be the best antioxidant then known for the purpose.

An object of the present invention is to provide compounds for retarding the deterioration and flex-cracking of rubber. A still further object is to provide rubber which is more resistant against deterioration due to the action of light, heat and oxygen and flexing. Further objects are to provide new compositions of matter and to advance the art. Still further objects will appear hereinafter.

These objects may be accomplished in accordance with our invention which comprises treating rubber with 4:4'-dialkoxy-N-alkyl diarylamines in which the aryl groups are of the benzene series and each alkyl group contains from 1 to 6 carbon atoms. This invention is an improvement or modification of that of British Patent 434,951. The compounds of the present invention protect the rubber almost equally well against flex-cracking and as well or better against the deterioration as the compounds of the British patent as is shown by accelerated aging tests.

In order to more fully illustrate my invention, the preferred modes of carrying the same into effect and the advantageous results to be obtained thereby, the following example is given:

Example

The antioxidant was incorporated in the following rubber mix.

| | Parts |
|---|---|
| Smoked sheet | 100 |
| Zinc oxide | 5 |
| Gas black | 40 |
| Stearic acid | 4 |
| Sulphur | 3.25 |
| Diphenylguanidine | 1.25 |
| Antioxidant | 1 |

The mix was vulcanized for 1 hour at 141° C. and samples of the vulcanizates given accelerated aging tests at 70° C. in oxygen in a Bierer-Davis bomb at 300 lbs./sq. inch for 2 and 4 days. The following results were obtained. Results on corresponding vulcanizates made using 1 part of phenyl-a-naphthylamine and other known antioxidants, instead of the antioxidants of our invention, are given for comparison.

| Antioxidant | Tensile strength in kg./sq. cm. | | |
|---|---|---|---|
| | Before aging | After 2 days aging | After 4 days aging |
| 4:4' - dimethoxy - N - methyldiphenylamine | 250 | 188 | 143 |
| 4:4' - dimethoxy - 3:3' - dimethyl - N - methyl-diphenylamine | 233 | 183 | 141 |
| 4:4'-diethoxy-N-ethyl diphenylamine | 236 | 187 | 141 |
| Phenyl-a-naphthylamine | 241 | 179 | 119 |
| N-methylphenyl-β-naphthylamine | 255 | | 100 |
| N-methyl-p-methoxy-phenyl-β-naphthylamine | 261 | | 127 |
| N-methyldiphenylamine | 253 | | 92 |
| N-benzyl-N-methylaniline | 252 | | 57 |

Samples of the vulcanizates were also given flexing tests on the Du Pont machine (Rubber Age, New York, 1930, 26, 542). The resistance to flex-cracking of each of the first three was greater than that of the others, and nearly as great as that of 4:4'-dimethoxydiphenylamine.

The compounds of our invention are new. The 4:4'-dimethoxy-N-methyldiphenylamine may be made by completely methylating 4:4'-dihydroxydiphenylamine with dimethyl sulphate and sodium hydroxide in alcohol. It melts at 99° C. 4:4'-dimethoxy-3:3'-dimethyl-N-methyldiphenylamine, melting at 82 to 84° C., may be prepared similarly from 4:4'-dihydroxy 3:3'-dimethyldiphenylamine. 4:4'-dihydroxy - 3:3'-dimethyldiphenylamine may be made by oxidizing molar quantities of 5-amino-2-cresol and o-cresol to an indophenol with sodium hypochlorite, by the method described by Heller in Leibig's Annalen (1912) 392, 39, and then reducing the indophenol with sodium hydrosulphite. 4:4' - diethoxy - N - ethyldiphenylamine may be made by completely ethylating 4:4' - dihydroxydiphenylamine with ethyl bromide in aqueous caustic soda. After recrystallizing from alcohol it melts at 44° to 45° C. Other compounds falling within our invention may be made by similar methods.

While we have disclosed the preferred embodiments of our invention, and the preferred modes of carrying the same into effect, it will be obvious to those skilled in the art that many variations and modifications may be made therein without departing from the spirit of our invention. Accordingly, our invention is to be limited solely by the appended claims construed as broadly as is permissible in view of the prior art.

We claim:

1. The method which comprises incorporating in rubber a small amount of a 4:4'-dialkoxy-N-alkyl-diarylamine in which the aryl groups are of the benzene series and each alkyl radical contains from 1 to 6 carbon atoms.

2. The method which comprises incorporating in rubber a small amount of a 4:4'-dialkoxy-N-alkyl-diphenylamine in which each alkyl radical contains from 1 to 6 carbon atoms.

3. The method which comprises incorporating in rubber a small amount of a 4:4'-dimethoxy-N-methyl-diarylamine in which the aryl groups are of the benzene series.

4. The method which comprises incorporating in rubber a small amount of 4:4'-dimethoxy-N-methyl diphenylamine.

5. Rubber having incorporated therein a small amount of a 4:4'-dialkoxy-N-alkyl-diarylamine in which the aryl groups are of the benzene series and each alkyl radical contains from 1 to 6 carbon atoms.

6. Rubber having incorporated therein a small amount of a 4:4'-dialkoxy-N-alkyl-diphenylamine in which each alkyl radical contains from 1 to 6 carbon atoms.

7. Rubber having incorporated therein a small amount of a 4:4'-dimethoxy-N-methyl-diarylamine in which the aryl groups are of the benzene series.

8. Rubber having incorporated therein a small amount of 4:4'-dimethoxy-N-methyl diphenylamine.

9. The method which comprises incorporating in rubber a small amount of 4:4'-dimethoxy-3:3'-dimethyl-N-methyldiphenylamine.

10. The method which comprises incorporating in rubber a small amount of 4:4'-diethoxy-N-ethyl-diphenylamine.

11. Rubber having incorporated therein a small amount of 4:4'-dimethoxy-3:3'-dimethyl-N-methyl-diphenylamine.

12. Rubber having incorporated therein a small amount of 4:4'-diethoxy-N-ethyl-diphenylamine.

13. The method which comprises incorporating in rubber a small amount of a 4:4'-dialkokoxy-N-alkyl-diarylamine in which the aryl groups are methyl substituted benzene rings and each alkoxy radical and each alkyl radical contains from 1 to 6 carbon atoms.

WILLIAM BAIRD.
MALDWYN JONES.

CERTIFICATE OF CORRECTION.

Patent No. 2,184,512. December 26, 1939.

WILLIAM BAIRD, ET AL.

It is hereby certified that error appears in the printed specification of the above numbered patent requiring correction as follows: Page 2, second column, line 32, claim 13, for "-dialkokoxy-N-" read -dialkoxy-N-; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.